(12) United States Patent
Bagchi et al.

(10) Patent No.: US 9,201,739 B1
(45) Date of Patent: Dec. 1, 2015

(54) METHOD AND SYSTEM FOR A DATABASE MANAGEMENT SYSTEM ADD-IN FOR THIRD PARTY BACKUP AND RESTORE APPLICATIONS

(71) Applicant: EMC Corporation, Hopkinton, MA (US)

(72) Inventors: Krishnendu Bagchi, Bangalore (IN); Aditya Kapoor, Bangalore (IN); Elango Chockalingam, Bangalore (IN); Vedavathi Ht, Bangalore (IN); Upanshu Singhal, Bangalore (IN)

(73) Assignee: EMC Corporation, Hopkinton, CA (US)

( * ) Notice: Subject to any disclaimer, the term of this patent is extended or adjusted under 35 U.S.C. 154(b) by 216 days.

(21) Appl. No.: 13/710,111

(22) Filed: Dec. 10, 2012

(51) Int. Cl.
*G06F 17/30* (2006.01)
*G06F 11/14* (2006.01)

(52) U.S. Cl.
CPC ........ *G06F 11/1469* (2013.01); *G06F 11/1451* (2013.01); *G06F 11/1458* (2013.01)

(58) Field of Classification Search
CPC ............ G06F 11/1469; G06F 11/1451; G06F 11/1458; G06F 11/1461
USPC ........................................................ 707/654
See application file for complete search history.

(56) References Cited

U.S. PATENT DOCUMENTS

| 8,725,965 | B2* | 5/2014 | Hart et al. ..................... 711/162 |
| 2008/0177861 | A1* | 7/2008 | Basani et al. ................. 709/218 |
| 2008/0222734 | A1* | 9/2008 | Redlich et al. .................. 726/26 |
| 2008/0243979 | A1* | 10/2008 | Cherkauer et al. ............ 708/303 |
| 2013/0006945 | A1* | 1/2013 | Prahlad et al. ................ 707/674 |
| 2013/0339643 | A1* | 12/2013 | Tekade et al. ................. 711/162 |
| 2014/0040579 | A1* | 2/2014 | Kripalani ...................... 711/162 |

* cited by examiner

*Primary Examiner* — Leslie Wong
(74) *Attorney, Agent, or Firm* — Dergosits & Noah LLP; Todd A. Noah

(57) ABSTRACT

A database management system add-in for third party backup and restore applications is described. An opportunity to select from multiple backup and restore applications is enabled via a user interface of a database management system. A selection of a backup and restore application of the multiple backup and restore applications is received. Multiple options offered by the backup and restore application are displayed. A selection of an option of the multiple options is received. Execution of the option is enabled, wherein the option is unavailable via a native backup and restore application offered by the database management system.

20 Claims, 4 Drawing Sheets

METHOD AND SYSTEM FOR A DATABASE MANAGEMENT SYSTEM ADD-IN FOR THIRD PARTY BACKUP AND RESTORE APPLICATIONS

BACKGROUND

A database management system is a set of programs that enables users to store, modify, and extract information from a database, and provides users with tools to add, delete, access, modify, and analyze data stored in one location. Users can access the data by using query and reporting tools that are part of the database management system or by using application programs specifically written to access the data. The information from a database can be presented in a variety of formats. Most database management systems include a report writer program that enables users to output data in the form of a report. Many database management systems also include a graphics component that enables users to output information in the form of graphs and charts. Many different types of database management systems range from small systems that run on personal computers to huge systems that run on mainframes. Computerized library systems, flight reservation systems, and computerized parts inventory systems are examples of database applications. Database management systems typically support query languages, which are dedicated database languages that considerably simplify writing database application programs. Database languages also simplify the database organization as well as retrieving and presenting information from databases. A database management system provides facilities for maintaining database security and controlling data access, enforcing data integrity, managing concurrency control, and recovering the database after failures and restoring it from backup files.

BRIEF DESCRIPTION OF THE DRAWINGS

Advantages of the subject matter claimed will become apparent to those skilled in the art upon reading this description in conjunction with the accompanying drawings, in which like reference numerals have been used to designate like elements, and in which:

DETAILED DESCRIPTION

Since database administrators spend most of their time using their database management system's graphic user interface to manage database-related operations, they are more familiar with accessing their database management system's graphic user interface than with accessing the graphic user interfaces offered by third-party backup/restore applications. Embodiments herein provide a database management system add-in for third-party backup/restore applications. An add-in for a database management system enables a graphic user interface of the database management system to display an opportunity to select from multiple third-party backup/restore applications instead of displaying the opportunity to select only the native backup/restore application offered by the database management system. The add-in receives a selection of one of the multiple third-party backup/restore applications, and displays the options offered by the selected third-party backup/restore application. The add-in receives a selection of one of the displayed options, and enables execution of the selected option, an option which is often unavailable from the native backup/restore application offered by the database management system. By means of this add-in, database administrators can easily invoke backup/restore operations with expanded capabilities from the database management system's familiar graphic user interface without having to access any third-party application's unfamiliar graphic user interface, which improves the total customer experience for the database administrators.

Figure 1:
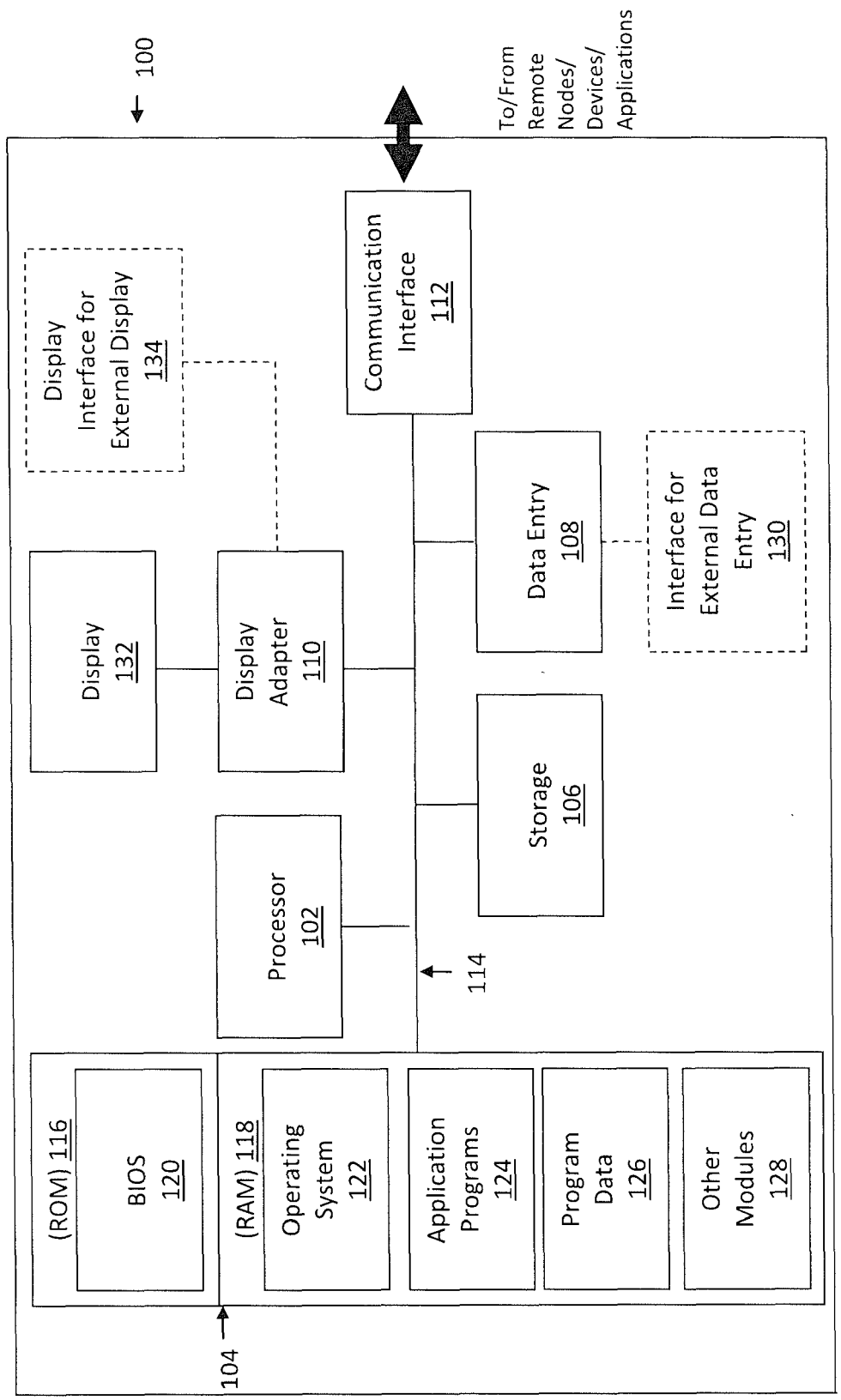
FIG. 1 is a block diagram illustrating an example hardware device in which the subject matter may be implemented.

Prior to describing the subject matter in detail, an exemplary hardware device in which the subject matter may be implemented shall first be described. Those of ordinary skill in the art will appreciate that the elements illustrated in FIG. 1 may vary depending on the system implementation. With reference to FIG. 1, an exemplary system for implementing the subject matter disclosed herein includes a hardware device 100, including a processing unit 102, memory 104, storage 106, data entry module 108, display adapter 110, communication interface 112, and a bus 114 that couples elements 104-112 to the processing unit 102.

The bus 114 may comprise any type of bus architecture. Examples include a memory bus, a peripheral bus, a local bus, etc. The processing unit 102 is an instruction execution machine, apparatus, or device and may comprise a microprocessor, a digital signal processor, a graphics processing unit, an application specific integrated circuit (ASIC), a field programmable gate array (FPGA), etc. The processing unit 102 may be configured to execute program instructions stored in memory 104 and/or storage 106 and/or received via data entry module 108.

The memory 104 may include read only memory (ROM) 116 and random access memory (RAM) 118. Memory 104 may be configured to store program instructions and data during operation of device 100. In various embodiments, memory 104 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 104 may also include nonvolatile memory technologies such as nonvolatile flash RAM (NVRAM) or ROM. In some embodiments, it is contemplated that memory 104 may include a combination of technologies such as the foregoing, as well as other technologies not specifically mentioned. When the subject matter is implemented in a computer system, a basic input/output system (BIOS) 120, containing the basic routines that help to transfer information between elements within the computer system, such as during start-up, is stored in ROM 116.

The storage 106 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 100.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 106, ROM 116 or RAM 118, including an operating system 122, one or more applications programs 124, program data 126, and other program modules 128. A user may enter commands and information into the hardware device 100 through data entry module 108. Data entry module 108 may include mechanisms such as a keyboard, a touch screen, a pointing device, etc. Other external input devices (not shown) are connected to the hardware device 100 via external data entry interface 130. By way of example and not limitation, external input devices may include a microphone, joystick, game pad, satellite dish, scanner, or the like. In some embodiments, external input devices may include video or audio input devices such as a video camera, a still camera, etc. Data entry module 108 may be configured to receive input from one or more users of device 100 and to deliver such input to processing unit 102 and/or memory 104 via bus 114.

A display 132 is also connected to the bus 114 via display adapter 110. Display 132 may be configured to display output of device 100 to one or more users. In some embodiments, a given device such as a touch screen, for example, may function as both data entry module 108 and display 132. External display devices may also be connected to the bus 114 via external display interface 134. Other peripheral output devices, not shown, such as speakers and printers, may be connected to the hardware device 100.

The hardware device 100 may operate in a networked environment using logical connections to one or more remote nodes (not shown) via communication interface 112. The remote node may be another computer, a server, a router, a peer device or other common network node, and typically includes many or all of the elements described above relative to the hardware device 100. The communication interface 112 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 112 may include logic configured to support direct memory access (DMA) transfers between memory 104 and other devices.

In a networked environment, program modules depicted relative to the hardware device 100, or portions thereof, may be stored in a remote storage device, such as, for example, on a server. It will be appreciated that other hardware and/or software to establish a communications link between the hardware device 100 and other devices may be used.

It should be understood that the arrangement of hardware device 100 illustrated in FIG. 1 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of hardware device 100. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 1. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

To facilitate an understanding of the subject matter described below, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context. In an embodiment, the computer system 100 includes one or more methods for a database management system add-in for third party backup/restore applications.

Since database administrators spend most of their time using their database management system's graphic user interface to manage database-related operations, they are more familiar with accessing their database management system's graphic user interface than with accessing the graphic user interfaces offered by third-party backup/restore applications. Embodiments herein provide a database management system add-in for third-party backup/restore applications. By means of this add-in, database administrators can easily invoke backup/restore operations with expanded capabilities from the database management system's familiar graphic user interface without having to access any third-party application's unfamiliar graphic user interface, which improves the total customer experience for the database administrators.

Figure 2:
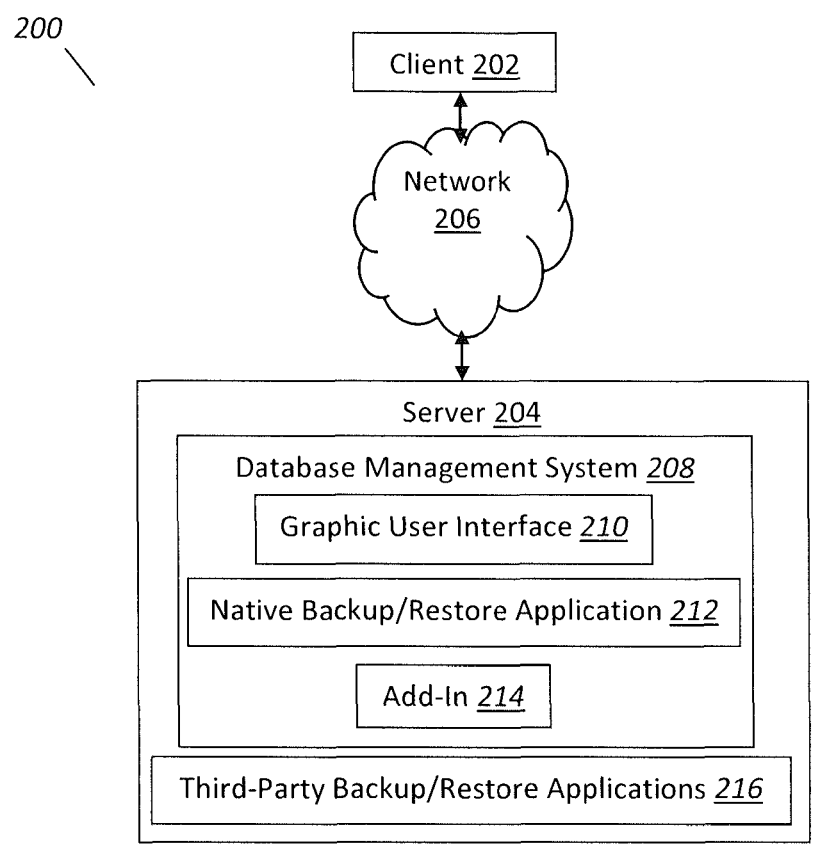
FIG. 2 illustrates a block diagram of an example system for a database management system add-in for third party backup/restore applications, under an embodiment.

FIG. 2 illustrates a block diagram of a system that implements a database management system add-in for third party backup/restore applications, under an embodiment. As shown in FIG. 2, system 200 may illustrate a cloud computing environment in which data, applications, services, and other resources are stored and delivered through shared data-centers and appear as a single point of access for the users. The system 200 may also represent any other type of distributed computer network environment in which servers control the storage and distribution of resources and services for different client users.

In an embodiment, the system 200 represents a cloud computing system that includes a client 202 and a server 204 that is provided by a hosting company. The client 202 and the server 204 communicate via a network 206. Although FIG. 2 depicts the system 200 with one client 202, one server 204, and one network 206, the system 200 may include any number of clients 202, servers 204, and networks 206. The client 202 and the server 204 may each be substantially similar to the system 100 depicted in FIG. 1.

The server 204 includes a database management system 208, which includes a graphic user interface 210 and a native backup/restore application 212. Embodiments of the present disclosure add an add-in 214 to the database management system 208. The add-in 214 can communicate with the third party backup/restore applications 216. Although FIG. 2 depicts the system elements 208-216 residing completely on the server 204, the system elements 208-216 may reside completely on the client 202, or in any combination of partially on the client 202 and partially on the server 204.

The add-in 214 for the database management system 208 enables the graphic user interface 210 of the database management system 208 to display an opportunity to select from the multiple third-party backup/restore applications 216 instead of the opportunity to select only the native backup/restore application 212 offered by the database management system 208.

The database management system 208 may be a SQL (structured query language) server management studio, a software application first launched with the Microsoft SQL Server® 2005 that is used for configuring, managing, and administering all components within Microsoft SQL Server®. The SQL server management studio includes both script editors and graphical tools which work with objects and features of the Microsoft SQL Server®. A central feature of SQL server management studio is the object explorer, which allows users to browse, select, and act upon any of the objects within the Microsoft SQL Server®.

The add-in 214 for the database management system 208 may be a .NET framework managed dynamic-link library implementing Microsoft Visual Studio® add-in framework interfaces to function with SQL server management studio. This dynamic-link library can be registered as a .Net COM assembly. The .Net framework managed dynamic-link library contains a class called 'connect' which is derived from interfaces that are part of an assembly extensibility dynamic-link library which is provided by Microsoft Visual Studio® to support Microsoft Visual Studio® add-ins. The 'connect' class implements a few abstract interface methods to provide a handle to the SQL server management studio window as an object of a class called Addin. Using this instance of Addin class, all graphic user interface elements such as menu, toolbar, and child windows of the SQL server management studio window can be accessed or modified. Since the SQL server management studio window is actually a graphic user interface built on top of a Microsoft Visual Studio® shell, the add-in 214 is written for Microsoft Visual Studio® and behaves as an add-in to SQL server management studio. An additional registry entry for specifying this dynamic-link library assembly path can be created under the key related to a specific version of SQL server management studio. This entry enables the corresponding version of SQL server management studio to be aware of the need to load the add-in 214.

Figure 3:
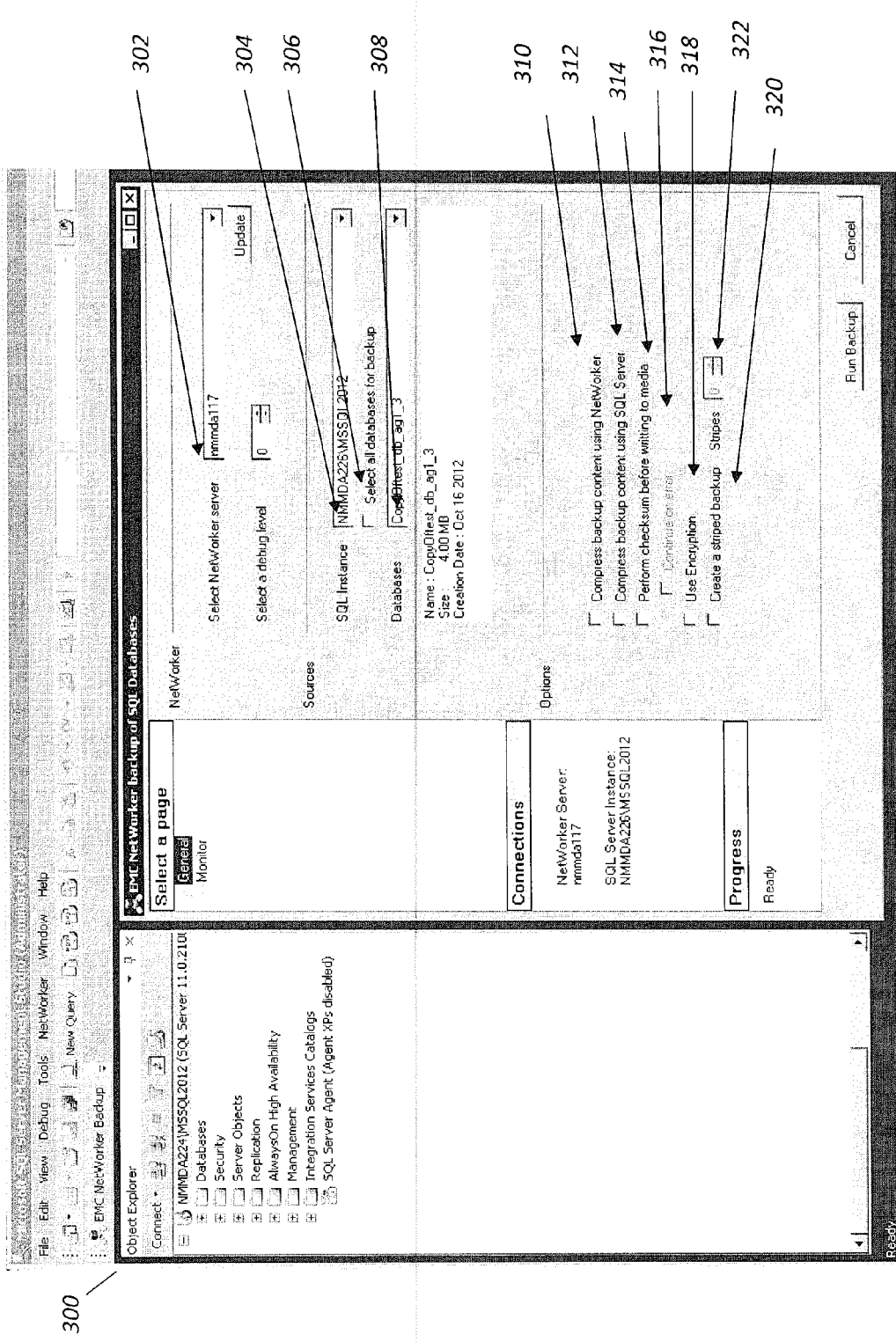
FIG. 3 illustrates a screen shot illustrating a frame of an example user interface screen of a display device supporting methods for a database management system add-in for third party backup/restore applications, under an embodiment.

Each version of SQL server management studio refers to a special key in registry to determine if any add-ins are to be loaded. After the SQL server management studio loads the add-in 214, the SQL server management studio's main window contains a new toolbar button for the add-in 214. After selecting the toolbar button enables the selection of one of the third-party backup/restore applications 216, a new window that may looks similar to the native backup/restore application 212 window opens, where the database administrator can select source/target databases along with different specific backup/restore application options. FIG. 3 below illustrates a sample backup window that opens after selection of one of the third-party backup/restore applications 216.

The multiple third-party backup/restore applications 216 may include EMC Corporation's NetWorker® backup/restore application. EMC Corporation's NetWorker® backup/restore application is a suite of enterprise level data protection software that unifies and automates backup to tape, disk-based, and flash-based storage media across physical and virtual environments for granular and disaster recovery. Cross-platform support is provided for many environments, including Microsoft Windows®. A central NetWorker® server manages a data zone that contains backup clients and NetWorker® storage nodes that access the backup media. The NetWorker® management console software provides a graphic user interface for functions such as client configuration, policy settings, schedules, monitoring, reports, and daily operations for deduplicated and non-deduplicated backups. The core NetWorker® software backs up client file systems and operating system environment. Add-on database and application modules provide backup services for products such as Microsoft® Exchange Server. Client backup data can be sent to a remote NetWorker® storage node or stored on a locally attached device by the use of a dedicated storage node. EMC Corporation's NetWorker® modules for Microsoft® applications supports Microsoft® products such as Microsoft® Exchange, Microsoft® Sharepoint, Microsoft® SQL Server, and Microsoft® Hyper-V servers.

The multiple third-party backup/restore applications 216 may include EMC Corporation's Avamar® backup/restore application, which provides fast, efficient backup and recovery through a complete software and hardware solution. Equipped with integrated variable-length deduplication technology, EMC Corporation's Avamar® backup/restore application facilitates fast, daily full backups for virtual environments, remote offices, enterprise applications, network access servers, and desktops/laptops. Data deduplication significantly reduces backup time by only storing unique daily changes, while always maintaining daily full backups for immediate single-step restore. The transmission of deduplicated backup sends only changed blocks, reducing network traffic. EMC Corporation's Avamar® backup/restore application leverages existing local area network and wide area network bandwidth for enterprise-wide and remote/branch office backup and recovery. Every backup is a full backup, which makes it easy for users to browse, point, and click for a single-step recovery. EMC Corporation's Avamar® data store features redundant power and networking, redundant array of independent disks, and redundant array of inexpensive nodes technology to provide uninterrupted data accessibility. Daily data systems checks ensure recoverability whenever needed. EMC Corporation's Avamar® systems can be deployed in an integrated solution with EMC Corporation's Data Domain® systems for high-speed backup and recovery of specific data types.

The multiple third-party backup/restore applications 216 may include EMC Corporation's Data Domain® backup/restore application, which provides deduplication storage systems that continue to revolutionize disk backup, archiving, and disaster recovery with high-speed, inline deduplication. By consolidating backup and archive data on an EMC Corporation's Data Domain® system, users can significantly reduce storage requirements, making disk cost-effective for onsite retention and highly efficient for network-based replication to disaster recovery sites. EMC Corporation's Data Domain® systems are qualified with leading enterprise backup and archiving applications, integrating easily into existing storage infrastructures. EMC Corporation's Data Domain® systems send only deduplicated and compressed data across the network, requiring a fraction of the bandwidth, time, and cost compared to traditional replication methods. EMC Corporation's Data Domain® systems provide continuous recovery verification, fault detection, and healing for end-to-end data integrity.

The add-in 214 receives a selection of one of the third-party backup/restore applications 216, and accesses the third-party backup/restore applications 216 to identify the options offered by the selected third-party backup/restore application.

The add-in 214 displays the options offered by the selected third party backup/restore application. The add-in 214 may display a graphic user interface that is specific to the selected backup/restore application and its options, or a general graphic user interface that includes all of the options offered by the third-party backup/restore applications 216.

The add-in 214 receives a selection of one of the displayed options, and enables execution of the selected option. The add-in 214 can build command lines to communicate with any of the third-party backup/restore applications 216, such as EMC Corporation's NetWorker® backup/restore application, EMC Corporation's Avamar® backup/restore application, and EMC Corporation's Data Domain® backup/restore application. For example, a specific command exists for most of the backup/restore operations through EMC Corporation's NetWorker® backup/restore application. For Microsoft® SQL Server, the specific command is called 'nsrsqlsv.' The add-in 214 is able to call this 'nsrsqlsv' command with its command line switches and in turn this 'nsrsqlsv' command initiates a database backup. If any of the third-party backup/restore applications 216 extend their features through libraries and application program interfaces, the add-in 214 can link those libraries and call those application program interfaces.

The selected option may be unavailable from the native backup/restore application 212 offered by the database management system 208. Examples of options that are unavailable in the native backup/restore application 212 offered by the database management system 208 are discussed below in reference to FIG. 3. By means of this add-in 214, database administrators can easily invoke backup/restore operations with expanded capabilities from the database management system's familiar graphic user interface 210 without having to access any third-party application's unfamiliar graphic user interface, which improves the total customer experience for the database administrators.

FIG. 3 is a screen shot illustrating a frame of an example user interface screen of a display device supporting methods for a database management system add-in for third party backup/restore applications. The frame 300 may include several backup options 302-322 offered by a version of EMC Corporation's NetWorker® backup/restore application. The "Select NetWorker server" option 302 enables a user to select the EMC Corporation's NetWorker® server to be involved in a backup operation. The "SQL Instance" dropdown 304 is populated with all available SQL instances on the host machine, and enables a user select one instance at a time. The "Select all databases for backup" check box 306 enables a user to select to back up all the databases of the instance currently selected in "SQL Instance" dropdown 304. This check box 306 is by default not checked. Checking this check box 306 disables the "Databases" dropdown 308, which is populated with all databases that can be backed up for the selected instance in "SQL Instance" dropdown 304.

The "Compress backup content using NetWorker" option 310 enables a user to select to apply X/open backup services application compression to all selected databases before writing the backup data to a storage device. Certain databases cannot be backed up with compression and others without during the same manual backup. Compressing data for a backup generates less network traffic and uses less backup media space, but it consumes additional processor resources. The "Compress backup content using SQL Server" option 312 enables a user to select to compress backup content using the SQL server's own compression technique.

The "Perform checksum before writing to media" option 314 enables a user to select to perform a checksum operation with the backup and to save the information to the backup media. Another checksum is performed before a restore to ensure that the restore checksum matches the backup checksum. EMC Corporation's NetWorker® backup/restore application verifies the checksum by calculating a local result and comparing it with the stored value. If the values do not match, a user can select to continue or to stop the backup/restore operation. The "Continue on checksum error" option 316 becomes selectable upon the selection of the "Perform checksum before writing to media" option 314, and enables a user to select to continue the backup/restore operation even if errors are detected.

The "Use Encryption" option 318 enables a user to specify that data is backed up with the advanced encryption standard encryption. Data is encrypted with the default or current pass phrase provided by an EMC Corporation's NetWorker® server. If the EMC Corporation's NetWorker® server has a different pass phrase at recovery time, a user specifies the pass phrase used at the time of backup. The "Create striped backup" option 320 enables a user to select to create a striped backup by using the SQL striped feature. If this "Create striped backup" option 320 is checked, the stripes list 322 is enabled. To select the number of stripes for backup, a user selects a number from the spin control. The frame 300 depicts some backup options 302-322 that are unavailable through the native backup/restore application 212. Other SQL backup/restore options that are unavailable through the native backup/restore application 212 and which may be depicted in the frame 300 include a bookmark option, and a volume shadow copy service option.

For example, a user may deploy EMC Corporation's RecoverPoint for continuous data protection for Microsoft® applications by leveraging RecoverPoint bookmarks for persistent volume shadow copy service snapshots, or as temporary snapshots to use for rollovers to disk or tape save sets. Volume shadow copy service is a technology included in Microsoft Windows® that allows making manual or automatic backup copies or snapshots of data, even if the data has a lock, on a specific volume at a specific point in time over regular intervals. Volume shadow copy service technology requires a file system to be a new technology file system (NTFS) to be able to create and store shadow copies. Shadow copies can be created on local and external (removable or network) volumes by any Microsoft Windows® component that uses this technology, such as when creating a scheduled Microsoft Windows® backup or automatic system restore point.

The frame 300 may be part of a larger display screen that includes fields for users to enter commands to create, retrieve, edit, and store records. The system 200 in FIG. 2 may output a display screen that includes the frame 300 in response to a search based on search criteria input via a user interface.

Because the frame 300 is a sample, the frame 300 could vary greatly in appearance. For example, the relative sizes and positioning of the text is not important to the practice of the present disclosure. The frame 300 can be depicted by any visual display, but is preferably depicted by a computer screen. The frame 300 could also be output as a report and printed or saved in electronic format, such as PDF. The frame 300 can be part of a personal computer system and/or a network, and operated from system data received by the network, and/or on the Internet. The frame 300 may be navigable by a user. Typically, a user can employ a touch screen input or a mouse input device to point-and-click to a location on the frame 300 to manage the text on the frame 300, such as a selection that enables a user to edit the text. Alternately, a user can employ directional indicators, or other input devices such as a keyboard. The text depicted by the frame 300 is an example, as the frame 300 may include a much greater amount of text. The frame 300 may also include fields in which a user can input textual information.

Figure 4:
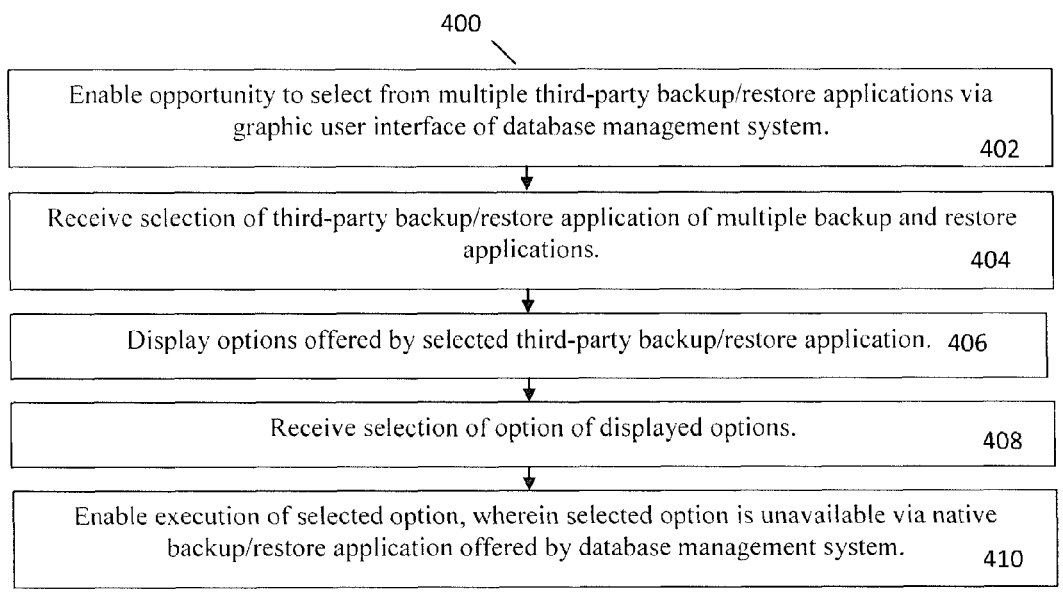
FIG. 4 is a flowchart that illustrates a method of a database management system add-in for third party backup/restore applications, under an embodiment.

FIG. 4 is a flowchart that illustrates a method of a database management system add-in for third party backup/restore applications. Flowchart 400 illustrates method acts illustrated as flowchart blocks for certain steps involved in and/or between the client 202 and/or the server 204 of FIG. 2.

An opportunity is enabled to select from multiple third-party backup/restore applications via a graphic user interface of a database management system, act 402. For example, the add-in 214 enables an opportunity to select from the multiple third-party backup/restore applications 216 via the graphic user interface 210 of a SQL server management studio.

A selection is received of a third-party backup/restore application of multiple third-party backup/restore applications, act 404. For example, the add-in 214 receives a selection of EMC Corporation's NetWorker® backup/restore application of the multiple third-party backup/restore applications 216.

Options offered by a backup/restore application are displayed, act 406. For example, the add-in 214 displays options offered by EMC Corporation's NetWorker® backup/restore application, as depicted by frame 300 in FIG. 3.

A selection is received of an option of the displayed options, act 408. For example, the add-in 214 receives a selection of the "use encryption" option 318 of the options 302-322 displayed by the frame 300 in FIG. 3.

Execution of an option is enabled, wherein the option is unavailable via a native backup/restore application offered by a database management system, act 410. For example, the add-in 214 enables execution of the selected encryption option, wherein the selected encryption option is unavailable via the native backup/restore application 212 offered by a SQL server management studio.

Although FIG. 4 depicts the acts 402-410 occurring in a specific order, the acts 402-410 may occur in another order. Embodiments herein enable users to easily invoke backup/restore operations with expanded capabilities from the database management system's familiar graphic user interface 210 without having to access any third-party application's unfamiliar graphic user interface, which improves the total customer experience for the database administrators.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A system for a database management system add-in for third party backup and restore applications, the system comprising:
a processor-based application, which when executed on a computer, will cause the processor to:
enable an opportunity to select from a plurality of backup and restore applications via a user interface specific to the database management system;
receive a user selection of a backup and restore application of the plurality of backup and restore applications;
display a plurality of options offered by the backup and restore application
corresponding to the user selection from the plurality of backup and restore applications;
receive a selection of an option of the plurality of options; and
enable execution of the option, wherein the option is unavailable via a native backup and restore application offered by the database management system.

2. The system of claim 1, wherein the plurality of options comprise an option to compress selected data using a X/open backup services application compression before writing the selected data to a storage device.

3. The system of claim 1, wherein the plurality of options comprise an option to encrypt selected data before communicating the selected data to a storage device.

4. The system of claim 1, wherein the plurality of options comprise an option to one of backup and restore a version of data based on a bookmark associated with the version of the data.

5. The system of claim 1, wherein the plurality of options comprise an option to make a backup copy of data on a specific volume at a specific point in time over regular intervals via a volume shadow copy service.

6. The system of claim 1, wherein the plurality of options comprise an option to select each and every database associated with a database instance currently selected for a backup operation.

7. The system of claim 1, wherein the database management system comprises a structured query language database management system.

8. A computer-implemented method for a database management system add-in for third party backup and restore applications, the method comprising:
enabling an opportunity to select from a plurality of backup and restore applications via a user interface specific to the database management system;
receiving a user selection of a backup and restore application of the plurality of backup and restore applications;
displaying a plurality of options offered by the backup and restore application
corresponding to the user selection from the plurality of backup and restore applications;
receiving a selection of an option of the plurality of options; and
enabling execution of the option, wherein the option is unavailable via a native backup and restore application offered by the database management system.

9. The method of claim 8, wherein the plurality of options comprise an option to compress selected data using X/open backup services application compression before writing the selected data to a storage device.

10. The method of claim 8, wherein the plurality of options comprise an option to encrypt selected data before communicating the selected data to a storage device.

11. The method of claim 8, wherein the plurality of options comprise an option to one of backup and restore a version of data based on a bookmark associated with the version of the data.

12. The method of claim 8, wherein the plurality of options comprise an option to make a backup copy of data on a specific volume at a specific point in time over regular intervals via a volume shadow copy service.

13. The method of claim 8, wherein the plurality of options comprise an option to select each and every database associated with a database instance currently selected for a backup operation.

14. The method of claim 8, wherein the database management system comprises a structured query language database management system.

15. A computer program product, comprising a non-transitory computer-readable medium having a computer-readable program code embodied therein, the computer-readable program code adapted to be executed by one or more processors to:
enable an opportunity to select from a plurality of backup and restore applications via a user interface specific to the database management system;
receive a user selection of a backup and restore application of the plurality of backup and restore applications;
display a plurality of options offered by the backup and restore application corresponding to the user selection from the plurality of backup and restore applications;
receive a selection of an option of the plurality of options; and
enable execution of the option, wherein the option is unavailable via a native backup and restore application offered by the database management system.

16. The computer program product of claim 15, wherein the plurality of options comprise an option to compress selected data using X/open backup services application compression before writing the selected data to a storage device.

17. The computer program product of claim 15, wherein the plurality of options comprise an option to encrypt selected data before communicating the selected data to a storage device.

18. The computer program product of claim 15, wherein the plurality of options comprise an option to one of backup and restore a version of data based on a bookmark associated with the version of the data.

19. The computer program product of claim 15, wherein the plurality of options comprise an option to make a backup copy of data on a specific volume at a specific point in time over regular intervals via a volume shadow copy service.

20. The computer program product of claim 15, wherein the plurality of options comprise an option to select each database associated with a database instance currently selected for a backup operation.

* * * * *